US007967891B2

(12) United States Patent
Paserin et al.

(10) Patent No.: US 7,967,891 B2
(45) Date of Patent: Jun. 28, 2011

(54) METHOD PRODUCING METAL NANOPOWDERS BY DECOMPOSITON OF METAL CARBONYL USING AN INDUCTION PLASMA TORCH

(75) Inventors: Vladimir Paserin, Mississauga (CA);
Richard S. Adams, Burlington (CA);
Maher I. Boulos, Sherbrooke (CA);
Jerzy Jurewicz, Sherbrooke (CA);
Jiayin Guo, Sherbrooke (CA)

(73) Assignees: Inco Limited, Toronto, Ontario (CA);
Tekna Plasma Systems, Inc., Sherbrooke, Quebec (CA)

( * ) Notice: Subject to any disclaimer, the term of this patent is extended or adjusted under 35 U.S.C. 154(b) by 502 days.

(21) Appl. No.: 11/444,793

(22) Filed: Jun. 1, 2006

(65) Prior Publication Data

US 2007/0277648 A1    Dec. 6, 2007

(51) Int. Cl.
*B22F 9/24*    (2006.01)
*B22F 9/28*    (2006.01)

(52) U.S. Cl. ............................................ 75/346; 75/362
(58) Field of Classification Search .................. 75/346, 75/362
See application file for complete search history.

(56) References Cited

U.S. PATENT DOCUMENTS

| 4,808,216 | A |   | 2/1989  | Kageyama et al. ............. 75/347    |
| 5,200,595 | A |   | 4/1993  | Boulos et al. ............. 219/121.52  |
| 5,403,375 | A |   | 4/1995  | Konig et al. ................... 75/255 |
| 5,413,821 | A | * | 5/1995  | Ellis et al. ..................... 427/576 |
| 6,036,742 | A | * | 3/2000  | Leutner et al. ................. 75/349  |
| 6,552,295 | B2 | * | 4/2003 | Markunas et al. ....... 219/121.36      |
| 6,689,192 | B1 |   | 2/2004 | Phillips et al. .................. 75/342 |
| 7,446,335 | B2 | * | 11/2008 | Kortshagen et al. ............ 257/51   |
| 2005/0211018 | A1 | * | 9/2005 | Jurewicz et al. ................ 75/346 |
| 2007/0085053 | A1 |   | 4/2007 | Gergely et al. ............ 252/62.56   |

FOREIGN PATENT DOCUMENTS

| WO |             000110 | 1/2006 |
| WO | WO 2006039453 A2 | 4/2006 |
| WO | WO 2006076613 S2 | 7/2006 |

OTHER PUBLICATIONS

Condensed Chemical Dictionary, eighth edition, revised by Gessner G. Hawley, Van Nostrand Reinhold, 1971, p. 477.*
C.M. Hollabaugh et al., "R.F.-plasma system for the production of uttrafine, ultrapure silicon carbide powder", Journal of Materials Science 18 (1983), pp. 3190-3194.
Q. Cheng et al. "Prepration of Nano-Mo Powder by Microwave Plasma" Journal of East China University of Science and Technology, vol. 24. No. 6, Dec. 1998 pp. 740, 731-734.
I. Bica, "Device for nanoparticle production using plasma methods" Rev. Metal, Madrid 35(2), 1999. pp. 126-130.
Brenner et al., "Microwave plasma synthesis of carbon-supported ultrafine metal particles," *Nanostructured Materials,* 8(1):1-17, 1997.
He et al., "Laser-driven aerosol synthesis of nickel nanoparticles," *Chem. Mater.*, 17:1017-1026, 2005.
Supplementary European Search Report, issued in European Application No. EP 07 71 9887, dated 18, 2010.

* cited by examiner

*Primary Examiner* — George Wyszomierski
(74) *Attorney, Agent, or Firm* — Fulbright & Jaworski L.L.P.

(57) ABSTRACT

A process for synthesizing metal nanopowders by introducing metal carbonyl into an induction plasma torch. By taking advantage of the much lower dissolution temperature of carbonyl as opposed to the high melting temperature of conventional metal powder feeds less torch power is required. Moreover, in contrast to current powder production techniques utilizing electrode based plasma torches, the induction plasma torch does not introduce contaminants into the nanopowder.

16 Claims, 5 Drawing Sheets

METHOD PRODUCING METAL NANOPOWDERS BY DECOMPOSITON OF METAL CARBONYL USING AN INDUCTION PLASMA TORCH

NAMES OF PARTIES TO A JOINT RESEARCH AGREEMENT

This application arises under an agreement between Inco Limited and Tekna Plasma Systems, Inc. made on Jun. 30, 2005.

TECHNICAL FIELD

The present invention relates to the production of metal powders in general and to a method for producing metal nanopowders from a carbonyl source using an induction plasma torch in particular.

BACKGROUND OF THE INVENTION

As electronic devices proliferate and diminish in size while simultaneously offering increased capabilities, there is concomitant need for enhanced integrated circuits, internal components and power supply systems. Demanding electronic systems of all stripes require finer and finer metal powders for multiple layer ceramic capacitors (MLCC's), batteries, switches, logic circuit components, etc.

Metal nanopowders, particularly ultrafine nickel powders, are produced in various ways. Chemical vapor deposition ("CVD") techniques based on carbonyl technology provide especially pure and desirable chemical and physical characteristics. However, due to the relatively low operating temperature of conventional carbonyl powder decomposers (400-700° C.), the morphology of conventional carbonyl powders may not be sufficiently spherical and smooth. Hot wall carbonyl decomposers, although capable of producing ultrafine metal powders on the order of one micron or less, typically create spiky and irregular shaped powder particles. Nickel chloride based CVD techniques produce smoother particles but they run hotter, introduce environmental issues and are inherently more costly.

Equipment manufacturers employing ultrafine nickel powders, for instance, are increasingly demanding highly spherical particle morphologies and smooth surfaces to minimize surface area and thus inherent powder reactivity and to improve the particle packing density.

Researchers have been investigating the use of various types of carbonyl based systems to produce metal nanopowders.

U.S. Pat. No. 4,808,216 to Kageyama et al. discloses a gas phase pyrolysis process for producing ultrafine powders wherein a hot diluted carbonyl compound is passed through a strong magnetic field.

U.S. Pat. No. 5,403,375 to König et al. discloses a furnace that employs a plurality of gas streams to prevent the deposition of the selected powders onto the hot walls. Gaseous metal compounds are evaporated prior to their introduction into the furnaces.

U.S. Pat. No. 6,689,192 B1 to Phillips et al. discloses the introduction of a plasma gas into a microwave cavity.

Others have introduced solid nickel particles into DC spray plasma reactors, transferred arc plasma reactors and induction plasma reactors.

Indeed, one of the present co-inventors (M. Boulos) is an inventor of U.S. Pat. No. 5,200,595, incorporated herein by reference, that discloses a high performance induction plasma torch commercially available from Tekna Plasma Systems, Inc. of Sherbrook, Quebec Canada.

As noted above, parties have used inductively coupled radio frequency ("RF") plasma systems to produce nickel nanoparticles by introducing fine nickel particles into the plasma. These nickel particles melt and vaporize in the plasma. As they exit the plasma, the gaseous nickel atoms condense into liquid droplets. The droplets cool and solidify into generally spherical nickel particles.

Plasma based processes for producing metal nanopowders are successfully utilized. However, they suffer from a number of drawbacks.

There are a number of disadvantages in using solid nickel feeds with DC arc and electrode based plasma reactors.

The reaction temperature using metallic nickel (or any metal for that matter) must exceed the melting point of the metal, which is 1453° C. for nickel. Since high plasma power is necessary, throughputs are limited. Metallic feeds, even if classified to fine dimensions, still contain oversize particles that will often pass through the plasma without being vaporized. These large particles report to the final product as undesirable size fractions.

Moreover, the use of metallic nickel feed requires a powder feeder. Powder feeds which are supposed to meter discrete quantities and rates of particles tend to both plug up and vary the feed rates causing unsteady reactor operations.

Electrode based plasma reactors such as DC spray plasma and transferred arc plasma systems introduce undesirable contaminants into the resulting powders from the electrodes.

There is needed an expeditious plasma method for making ultrafine metal spherical powders in general and nano sized nickel powders in particular.

SUMMARY OF THE INVENTION

There is provided a process for synthesizing metal nanopowders using an induction plasma torch and metal carbonyl feed materials. The inductive plasma torch possesses a high flexibility and tolerance to the processing chemistry because there are no metallic electrodes to react with the reactants and therefore oxidizing and reducing atmospheres can be used. Used in conjunction with metal carbonyl gas or liquid, the temperatures and total energy necessary to effect pure ultrafine powder production are significantly reduced compared to conventional metallic feeds. Since the residence times in induction plasma reactors are lower than those observed in other plasma systems, the powders experience less variation in quality.

PREFERRED EMBODIMENT OF THE INVENTION

Although authorities have yet to agree on precise definitions of "nanopowders" and ultrafine powders, for the purposes of this specification, such powders are composed of metal particles having a typical mean particle diameter in the range of about 1 to 100 nm.

Figure 1:
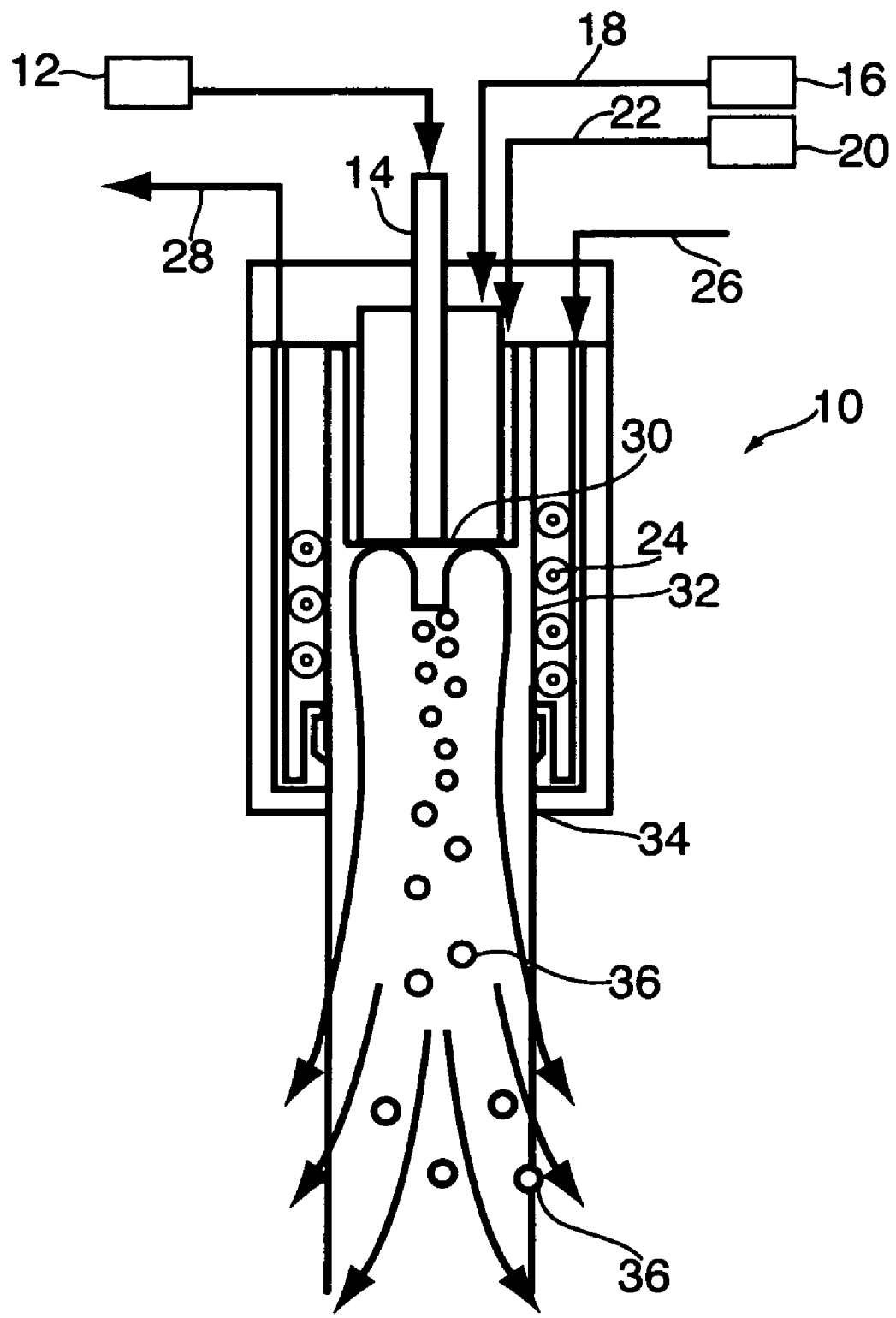
FIG. 1 is a cross sectional view of an embodiment of the invention.

FIG. 1 represents a cross-sectional schematic view of an RF induction plasma torch 10 as per U.S. Pat. No. 5,200,595 referenced above.

As discovered by Mond and Langer during the latter part of the 19th century, nickel freely combines with and disassociates from carbon monoxide. By decomposing nickel carbonyl (Ni(CO)$_4$), an exquisitely pure form of nickel can be produced. The main reaction is:

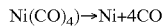

Ni(CO)$_4$ → Ni + 4CO

Due to the high amount of energy available in the resultant plasma (64 kW) and the low energy required to decompose nickel carbonyl into nickel and carbon monoxide, the induction plasma torch 10 provides an excellent platform to generate nickel and other metal nanopowders.

Since the decomposition temperature of gaseous nickel carbonyl is about 200° C. as compared to the melting temperature of nickel powder (1453° C.) the present carbonyl based process requires significantly less power than conventional solid metallic feed processes. This means that for a given plasma power, increased production levels can be realized when using nickel carbonyl as the feed compound when compared to nickel powder as feed. By combining high plasma temperatures and low decomposition temperatures, high heating and quench rates follow. This results in fast nucleation and the production of small particles having improved spherical morphology and crystallinity.

In a preferred embodiment of the present invention, metal carbonyl gas along with a carrier or diluting gas such as helium, argon, nitrogen, hydrogen, carbon monoxide, etc. either solely or in combination are axially introduced from supply 12 into central conduit 14 of the torch 10. A plasma gas such as helium, argon, nitrogen, hydrogen, carbon monoxide, etc. either solely or in combination from plasma gas source 16 is applied to the torch 10 via conduit 18 for the purpose of magnetic coupling of gas to form plasma. A sheath gas such as helium, argon, nitrogen, hydrogen, carbon monoxide, etc. either solely or in combination is supplied to the torch 10 via conduit 22 from the sheath gas supply 20. The sheath gas insulates the carbonyl from the hot inner wall of the torch 10 and, if desired, influences the mixing patterns of the torch 10.

Cooling water is introduced to circulate around an RF induction coil 24 through input port 26 whereupon it exits at cooling water output port 28.

Upon energizing the torch 10, the metal carbonyl gas is introduced into a chamber 32 via the central conduit 14.

The metal carbonyl is subjected to an extremely rapid decomposition and quench below the terminus 30 of the central conduit 14 in the chamber 32. Residence times are controlled by the nozzle geometry, location, and gas flow rates, and can be as short as a few milliseconds such as 0.001 seconds or as long as about 10 seconds.

The temperature at the terminus 30 is about 11,000 K. The high temperature is generated by the RF pulsing of the induction coils 24, ionizing the plasma gas within the reactor 10 volume. Temperatures can be adjusted from about 3,000 to 11,000 K.

Ultrafine (or nanosized) metal powders 36 are ejected from the exit nozzle 34 of the torch 10 into a reactor (not shown) where they are treated and then collected after passing through filters, such as sintered metal filter elements and other equipment known to those in the art.

As the metal carbonyl rapidly dissociates and the pure metal is quenched, the resulting homogenous nucleation gives rise to a very fine aerosol. The particle size distribution and crystal structure of the nanopowder are functions of the aerosol quench rate, the type of quench gas and precursor metal carbonyl gas composition or concentration. Typically inert quench gases such as argon or nitrogen are used for pure metal powder production. Reactive quench gases such as oxygen, ammonia or methane allow for the synthesis of ultrafine oxides, nitrides or carbides.

Regarding plasma energy, in a typical 64 kW torch, the energy coupling efficiency is about 65%, and the "overall" efficiency (taking into account all cooling and heat losses and coupling efficiency) is 30%, leaving about 19 kW net available power in the plasma. Only part of this is used for the dissociation of carbonyl (the rest of the energy essentially heats the gases and the resultant metal powder product) thus giving the final overall process efficiency of about 14%. A 64 kW plasma unit is expected to produce about 5 kg of metal nanopowder per hour.

A series of prototype tests were conducted to assess the efficacy of the present invention.

A Tekna Plasma Systems Inc. PL-50 induction plasma torch was employed along with a subsequent cyclone and filter baghouse to retrieve the metal powders. Torch plate power was 24-65 kW. The sheath gas was a helium/argon mixture delivered at 40 l/min/100 l/min and 12 psia (82.7/ kPa). Nickel carbonyl and the carrier gas of helium and carbon monoxide in a 20:1 ratio were delivered at 20 l/min and 0-5 psig (34.5 kPa).

Test results are shown below in Tables 1 and 2.

TABLE 1

| Test | Sample Location | PSD Volume-Based, Micrometers | | | | PSD Number-Based, Micrometers | | | | C wt % | O wt % | BET g/m$^2$ | TD g/cm$^3$ |
|---|---|---|---|---|---|---|---|---|---|---|---|---|---|
| | | D10 | D50 | D90 | D100 | D10 | D50 | D90 | D100 | | | | |
| 1 | Filter | 0.178 | 0.446 | 0.969 | na | na | na | na | na | na | na | 94 | na |
| 2 | Filter | 0.188 | 0.523 | 1.083 | na | na | na | na | na | na | na | 9 | na |
| 3 | na | na | na | na | na | na | na | na | na | na | na | na | na |
| 4 | Filter | 0.116 | 0.278 | 0.681 | 1.48 | 0.046 | 0.087 | 0.178 | 0.61 | 0.15 | 2.05 | 9.6 | 0.9 |
|   | Cyclone | 0.18 | 0.632 | 4.306 | 16.38 | 0.045 | 0.091 | 0.211 | 0.9 | 0.16 | 2.45 | 8.9 | na |
| 5 | Filter | 0.116 | 0.268 | 0.62 | 1.33 | 0.047 | 0.089 | 0.182 | 0.59 | 0.14 | 1.97 | 8.83 | na |
| 6 | Filter | 0.158 | 0.345 | 0.741 | 1.48 | 0.081 | 0.134 | 0.263 | 0.78 | 0.1 | 0.98 | 5.43 | na |
| 7 | Filter | 0.169 | 0.363 | 0.763 | 1.47 | 0.094 | 0.15 | 0.288 | 0.83 | 0.17 | 0.71 | 4.59 | 1.8 |
| 8 | Filter | 0.154 | 0.341 | 0.75 | 1.73 | 0.079 | 0.131 | 0.257 | 0.77 | 0.1 | 0.96 | 5.77 | 1.1 |

PSD = particle size distribution measured by Malvern ® Mastersizer 2000 instrument
BET = (Brunauer, Emmett and Teller) surface area by gas absorption measurement, g/m$^2$
TD = Tap density, g/cm$^3$

TABLE 2

| | Test Number | | | | |
|---|---|---|---|---|---|
| | 4 | 5 | 6 | 7 | 8 |
| Crystallite Size (Å) (Scherrer Equation) | 688 | 763 | 1000 | 737 | 854 |

Figure 2:
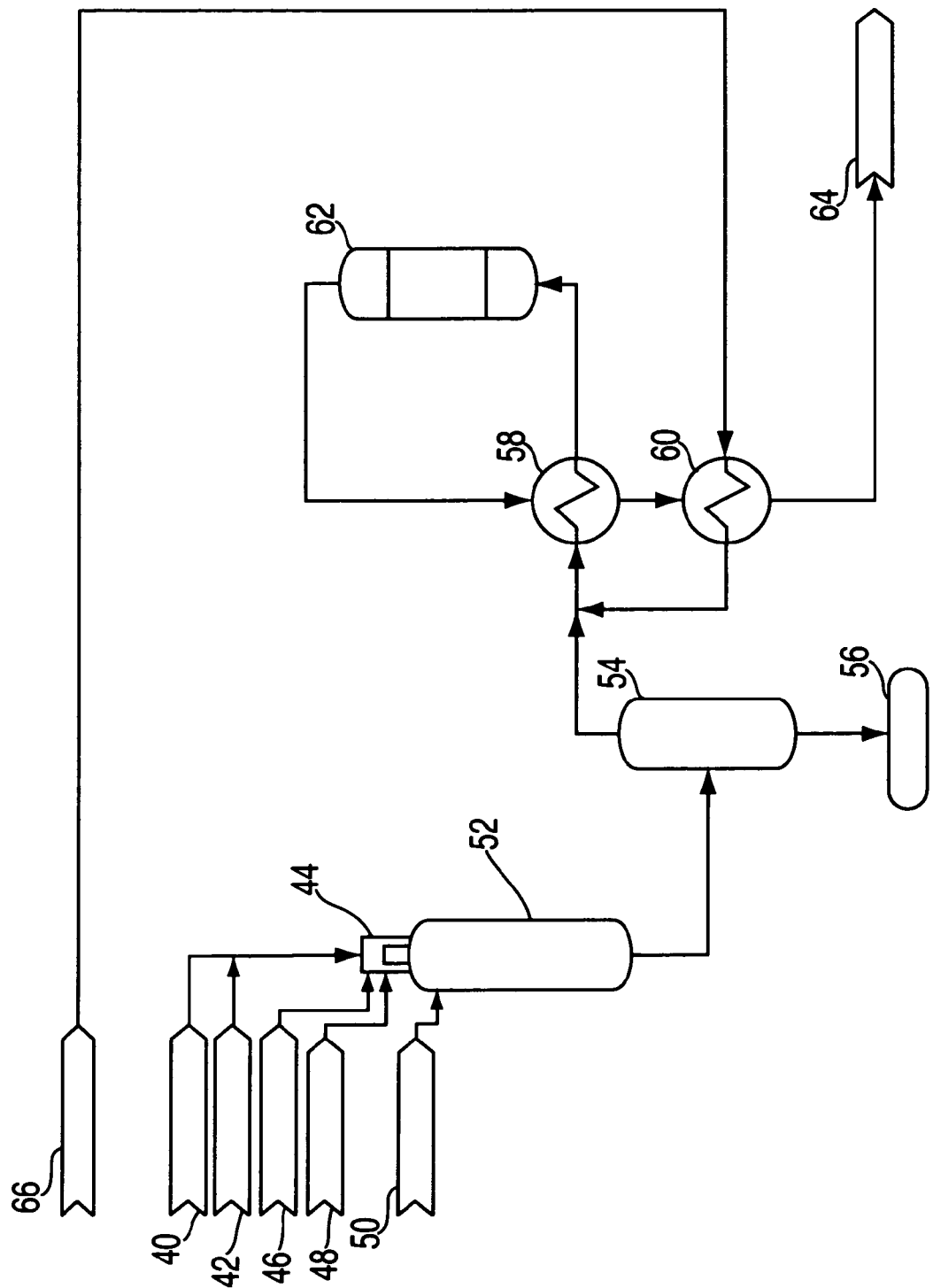
FIG. 2 is a schematic view of an embodiment of the invention.

FIG. 2 represents a potential commercial system.

Metal carbonyl gas 40 and a carrier gas 42 such as helium and carbonyl monoxide are introduced into induction plasma torch 44. Plasma gas 46 typically argon and sheath gas 48, typically argon and hydrogen, are supplied to the torch 44.

Upon emerging from the torch 44, the ultrafine metal is treated with a quench gas 50, typically argon and nitrogen in reactor 52 to cool the particles and, if desired, to react with the particles.

Upon sufficient cooling, the particles are routed to a filter 54 which may be, for example a cyclone and/or bag house. The finished product is collected in a container 56.

Remaining processing and product gases are separated at a stage one separator 58. The processing gases, primarily the carrier gas, plasma gas, sheath gas and quench gas are routed to stage two separator 60 for subsequent treatment. Carbon monoxide, the primary gaseous by-product of the dissolution reaction in the torch 44, is routed to a catalytic converter 62 where it is split into carbon and oxygen or oxidized to $CO_2$ and removed as an off gas 64. Air 66 is supplied as necessary. Alternatively, the carbon monoxide may be recycled for additional metal carbonyl production.

Figure 3:
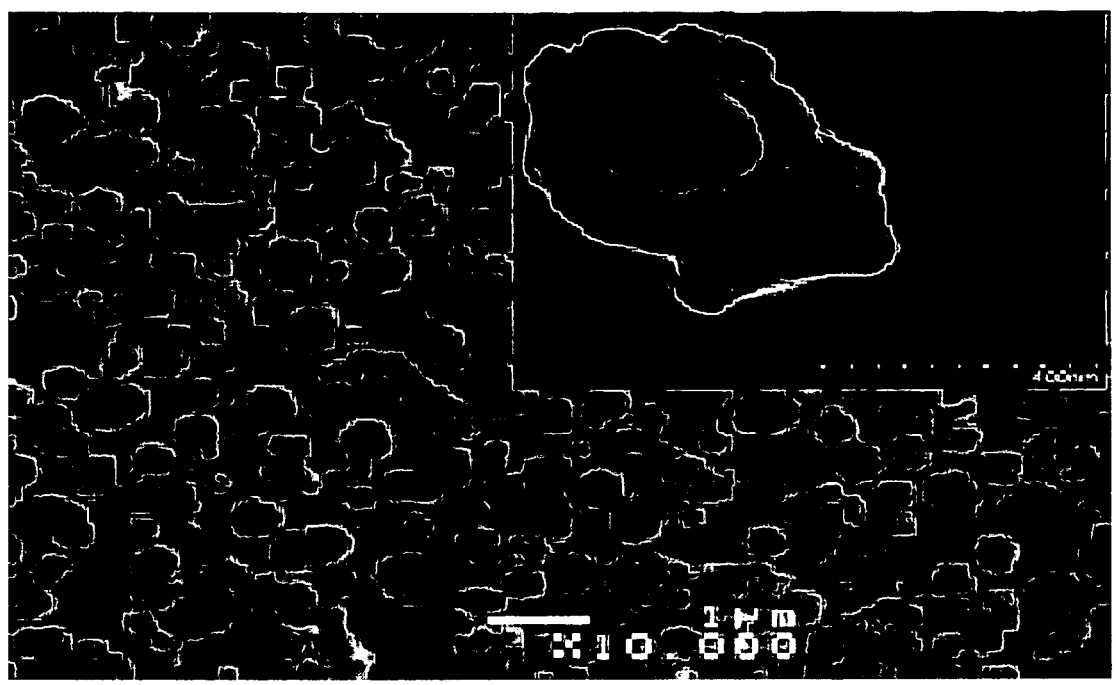
FIG. 3 is photomicrograph of prior art nickel powder.

FIG. 3 is a high resolution photomicrograph taken by a scanning electron microscope ("SEM") of commercial nickel powder made by a conventional carbonyl process. Note the somewhat spiky nature of the particles.

Figure 4:
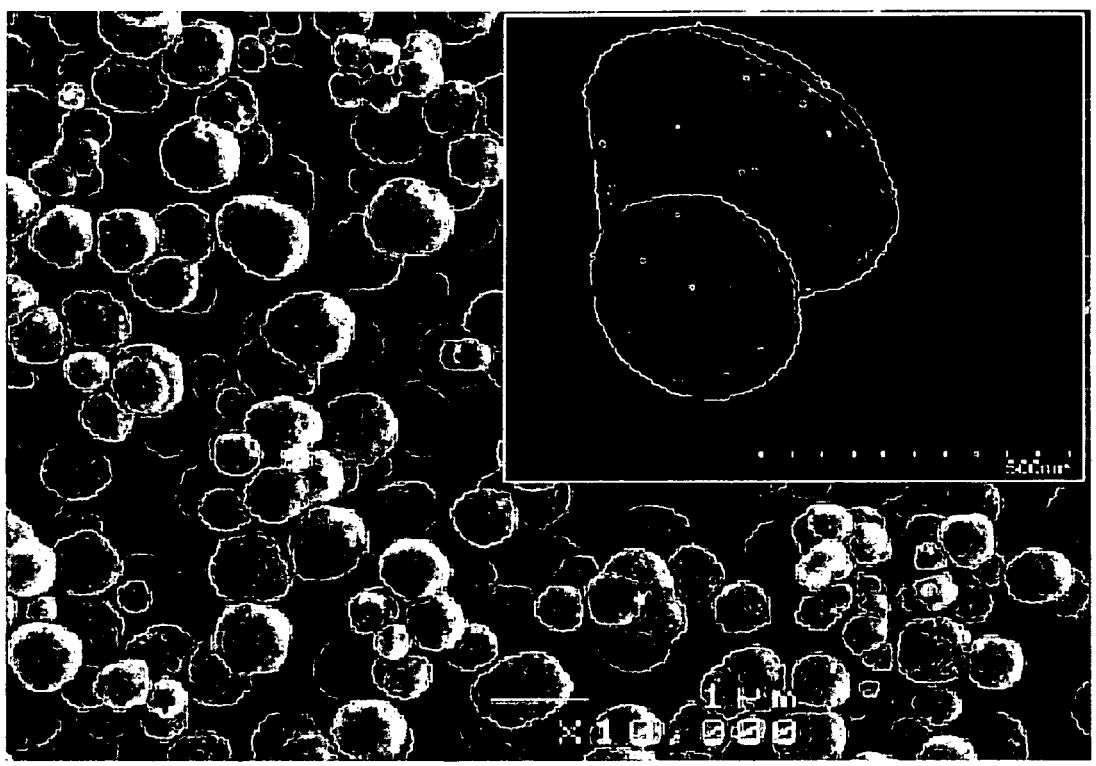
FIG. 4 is a photomicrograph of prior art nickel powder.

FIG. 4 is a high resolution photomicrograph taken by a SEM of commercial nickel powder made by a nickel chloride CVD process. Note the irregular arcuate structure of the particles.

Figure 5:
FIG. 5 is a photomicrograph of an embodiment of this invention.

FIG. 5 is a high resolution photomicrograph taken by SEM of nickel powders made in accordance with the present invention. Note the regular spherical nature of the particles. Significant numbers of the particles are at least substantially spherical.

Although primarily addressed to nickel nanopowder production, the present invention is applicable to any metal carbonyl, such as iron, copper, cobalt, chromium, molybdenum, tungsten, and ruthenium. Moreover, both gaseous and liquid forms of the metal carbonyl may be introduced into the torch 10.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

What is claimed is:

1. A process for producing nanopowder comprising:
    a) providing metal carbonyl;
    b) introducing the metal carbonyl into an induction plasma torch;
    c) causing the metal carbonyl to decompose within the induction plasma torch and form nanopowder comprising metal particles;
    d) quenching the nanopowder with a quench gas in a reactor disposed downstream from the plasma torch; and
    e) collecting the nanopowder,
    wherein the metal particles are substantially spherical.

2. The process according to claim 1 wherein the metal carbonyl is selected from at least one of the group consisting of nickel carbonyl, iron carbonyl, copper carbonyl, cobalt carbonyl, chromium carbonyl, molybdenum carbonyl, tungsten carbonyl, and ruthenium carbonyl.

3. The process according to claim 1 wherein the metal carbonyl is mixed with a carrier gas.

4. The process according to claim 3 wherein the carrier gas is selected from at least one of the group consisting of helium, argon, nitrogen, hydrogen, and carbon monoxide.

5. The process according to claim 1 wherein a plasma gas is introduced into the plasma torch.

6. The process according to claim 5 wherein the plasma gas is selected from at least one of the group consisting of helium, argon, nitrogen and hydrogen.

7. The process according to claim 1 wherein a sheath gas is introduced into the plasma torch.

8. The process according to claim 7 wherein the sheath gas is selected from at least one the group consisting of helium, argon, nitrogen and hydrogen.

9. The process according to claim 1 wherein the quench gas is selected from at least one of the group consisting of argon, nitrogen, oxygen, ammonia and methane.

10. The process according to claim 1 wherein the metal carbonyl is subjected to a temperature of about 3,000-1,000 K in the induction plasma torch.

11. The process according to claim 1 wherein the metal carbonyl resides in the induction plasma torch for about 0.001-10 seconds.

12. The process according to claim 1 wherein the nanopowder particles are filtered.

13. The process according to claim 1 wherein the temperature of the induction plasma torch is 11,000 K.

14. The process according to claim 1 wherein the metal carbonyl is a gas.

15. The process according to claim 1 wherein the metal carbonyl is a liquid.

16. The process according to claim 1 wherein the metal particles have a typical mean particle diameter in the range of about 1 to 100 nm.

* * * * *